Dec. 3, 1963    C. L. ENGLISH    3,112,646
VARIABLE ORIFICE FLOW INDICATOR
Filed Feb. 29, 1960
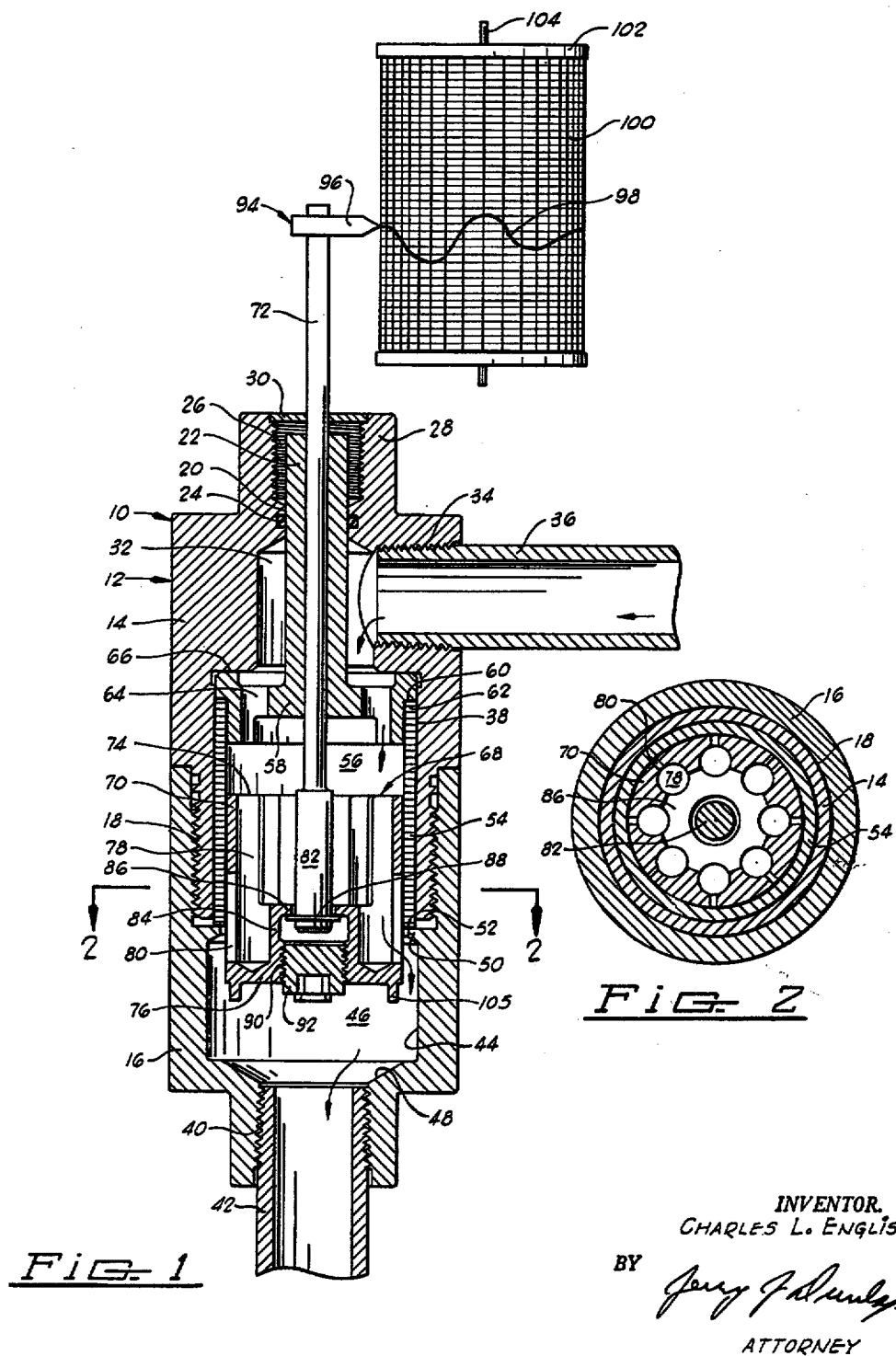
INVENTOR.
CHARLES L. ENGLISH
BY
*Jerry J. Dunlap*
ATTORNEY

United States Patent Office 3,112,646
Patented Dec. 3, 1963

3,112,646
VARIABLE ORIFICE FLOW INDICATOR
Charles L. English, 2204 E. 25th Place, Tulsa, Okla.
Filed Feb. 29, 1960, Ser. No. 11,817
5 Claims. (Cl. 73—208)

This invention relates generally to improvements in fluid flow meters, and more particularly, but not by way of limitation, to an improved variable orifice type flow meter.

As it is well known in various industries, knowledge of variations in the rate of flow of a fluid is necessary for control and analysis of the operation of equipment to which the fluid is directed, or from which the fluid is directed. For example, in the operation of subsurface hydraulic oil well pumps, variations in the rate of flow of power oil downwardly in a well to operate a pump, and variations in the rate of flow of fluid pumped upwardly through the well provide valuable information for an analysis of the operation of the pump. Variations in the rate of flow of the power oil being used to operate a subsurface hydraulic pump indicate the speed of operation of the pump, as well as the relative amounts of oil required for the upward and downward strokes of the pump. In this connection it should also be noted that knowledge of the precise times of variations in the rate of flow of the power oil provides extremely valuable information as to the precise times of shifting of the valve of the subsurface pump, as well as whether or not the valve remains on a particular seat during a complete stroke of the pump. Variations in the rate of flow of fluid being pumped upwardly through a well from a subsurface hydraulic pump provide valuable information regarding the performance of the pump, as well as the condition of the well in which the pump is utilized. No acceptable flow metering device is now available for measuring the variations in the rate of flow and the precise moments of these variations of either the power oil or the pumped fluids, and particularly devices for measuring the variations in the rate of flow of the power oil which is normally at a pressure of from 2,000 to 4,000 pounds per square inch and having a normal variation of about 50 pounds per square inch.

Various types of flow metering devices which may be considered of the variable orifice type have been devised, but none have been widely accepted. Generally speaking, these prior devices have utilized either a weight positioned directly on the variable orifice member, or a counterweight connected to the variable orifice member to counteract the pressure of the fluid being measured, and provide movement of the variable orifice member to indicate variations in the rate of fluid flow. When either a weight or counterweight is utilized, the device can be used only in one position and may be used to indicate the rate of flow of a fluid only when the pressure of the fluid is substantially constant. Also, prior variable orifice type flow metering devices have not been capable of a substantially instantaneous response to a rate of flow variation; have normally been complicated in construction, expensive and difficult to keep in adjustment.

The present invention contemplates a novel flow metering device of the variable orifice type wherein no weights or counterweights are required for moving the variable orifice member in response to variations in the rate of fluid flow through the device. The variable orifice member is of differential area construction and is moved solely by a differential of the pressure of the fluid being measured (upon variations in the rate of flow of this fluid), such that the device may be used in any position, the device will be substantially unaffected by normal variations in the inlet pressure of the fluid being measured, and the device will be substantially instantaneously responsive to force imposed on the variable orifice member upon a variation in the rate of flow of the fluid being measured can be easily controlled by sizing the difference in areas of the variable orifice member, such that sufficient force may always be provided on the variable orifice member for operating any desired type of indicating or recording mechanism.

In its broader aspects, the present invention may be defined as a flow responsive device for interposition in a fluid flow line, comprising a hollow housing through which said fluid is directed in one direction, said housing having a variable inner diameter, differential area piston means reciprocally disposed in said housing with the larger end thereof facing in the direction of the fluid flow and the smaller end thereof protruding through one end of the housing in communication with atmospheric pressure, means forming an orifice in said piston means extending in a direction to progressively open upon movement of said piston means in the direction of fluid flow, and means for registering movements of said piston means to indicate variations in the rate of said fluid flow.

An important object of this invention is to provide a highly sensitive and accurate device for measuring the variations in the rate of flow of a fluid.

Another object of this invention is to provide information for analysis of the operation of fluid-operated equipment.

A further object of this invention is to provide a variable orifice type flow responsive device which requires no weights or counterweights for controlling the movement of the variable orifice member upon variations in the rate of flow through the device.

Another object of this invention is to provide a variable orifice flow responsive device which will provide sufficient force for operating an indicating or recording mechanism upon a variation in the rate of fluid flow through the device.

Another object of this invention is to provide a variable orifice type flow responsive device wherein the variable orifice member is a portion of a differential area piston assembly movable solely by a differential of the pressure of the fluid being measured upon variations in the rate of flow of fluid through the device.

A still further object of this invention is to provide a simply constructed flow responsive device which may be economically manufactured and which will have a long service life.

Other objects and advantages of the invention will be evident from the following detailed description, when read in conjunction with the accompanying drawings which illustrate my invention.

In the drawings:
FIGURE 1 is a longitudinal sectional view through a flow responsive device constructed in accordance with this invention, with portions of the device shown schematically.

FIGURE 2 is a transverse cross sectional view through the device, as taken along lines 2—2 of FIG. 1.

Referring to the drawings in detail, reference character 10 generally designates a flow responsive device constructed in accordance with this invention which includes a housing 12 comprising upper and lower sections 14 and 16 interconnected by threads or the like 18. The housing section 14 is provided with a bore 20 therethrough slidingly receiving a tubular rod guide 22. A suitable sealing ring 24, such as an O-ring, is held in a mating groove around the bore 20 to provide a seal around the outer periphery of the rod guide 22, for purposes which will be disclosed. A threaded counterbore 26 is provided in the upper end 28 of the housing section 14 concentrically with respect to the bore 20 to support an indicating device or the like (not shown) if desired.

In the embodiment disclosed herein, the counterbore 26 is normally closed by a suitable cap 30 to prevent the entrance of foreign matter into the counterbore 26.

Another counterbore 32 is formed in the housing section 14 at the lower end of, and concentric with the bore 20, to form a chamber around the rod guide 22 which receives fluid being directed through the device. An inlet 34 is formed in one side of the housing section 14 in communication with the counterbore 32 and may be threaded or otherwise suitably adapted for connection with a portion 36 of a flow line through which the fluid being measured is directed. Still another counterbore 38 is formed at the lower end of, and concentric with, the counterbore 32 to provide a continuation of the chamber around the rod guide 22, for purposes which will be described.

The lower housing section 16 is provided with a bore 40 therethrough forming an outlet for the device 10, and the bore 40 may be threaded or otherwise suitably adapted for connection with another portion 42 of the flow line through which the fluid being measured is directed. A counterbore 44 is formed in the housing section 16 concentrically with respect to the bore 40 to provide a continuation of the chamber 46 formed by the counterbores 38 and 32 in the housing section 14. It may also be noted that the shoulder 48 between the counterbore 44 and the outlet 40 is tapered downwardly and inwardly toward the outlet 40, for purposes which will be described.

An upwardly facing shoulder 50 is formed around the upper end of the counterbore 44 directly below the threads 18 to contact the lower end 52 of a sleeve 54. The sleeve 54 preferably slidingly fits in the counterbore 38 of the housing section 14 to provide a reduced diameter portion 56 for the chamber 46. The lower end portion 58 of the rod guide 22 is enlarged to approximately the diameter of the counterbore 38 and is provided with a downwardly facing shoulder 60 for contacting the upper end 62 of the sleeve 54 and rigidly securing the sleeve 54 in the counterbore 38. It will also be observed that a plurality of apertures 64 are formed through the enlarged lower end portion 58 of the rod guide 22 to form passageways for the flow of fluid from the counterbore 32 into the reduced diameter portion 56 of the chamber 46. It will thus be apparent that when the housing sections 14 and 16 are threaded together by means of the threads 18, the upwardly facing shoulder 50 in the housing section 16 forces the sleeve 54 into engagement with the downwardly facing shoulder 60 of the rod guide 22, and forces the enlarged portion 58 of the rod guide 22 into contact with the upper end 66 of the counterbore 38 to rigidly secure the sleeve 54 and the rod guide 22 in their operating positions.

A differential area piston assembly, generally designated by reference character 68, is reciprocally disposed in the reduced diameter portion 56 of the chamber 46 for movement in accordance with variations in the rate of flow of fluid flowing from the conduit portion 36 through the device 10 and into the conduit portion 42. The piston assembly 68 comprises a variable orifice member 70, generally referred to herein as a thimble member because of its shape, and a rod 72 extending upwardly through the rod guide 22. The thimble member 70 is tubular in form, with its upper end 74 being open and its lower end 76 being closed. It will be observed that the closed end 76 of the thimble member faces the outlet 40, and the open end 74 faces the end of the chamber 46 associated with the inlet 34.

As shown most clearly in FIG. 2, a plurality of circumferentially spaced bores 78 are formed vertically in the walls of the thimble member 70 from the open end 74 of the thimble downwardly to the closed end 76 of the thimble. These bores 78 form passageways for fluid from the interior of the thimble and the upper end 74 of the thimble to vertical slots 80 formed through the walls of the thimble member 70. In a preferred construction, a slot 80 is formed through the walls of the thimble member 70 for each of the vertical bores 78 to provide a more uniform distribution of fluid flow through the thimble member 70. It will also be observed that each slot 80 extends from the closed end 76 of the thimble member a substantial distance upwardly toward the open end 74 of the thimble member, and when any portion of one of the slots 80 extends below the lower end 52 of the sleeve 54, the slots form orifices for the flow of fluid from the reduced diameter portion 56 of the chamber 46 into the lower, larger diameter portion of the chamber 46. It will also be apparent that as the thimble member 70 moves upwardly and downwardly in the sleeve 54, the orifices 80 are progressively closed and opened, respectively. In this latter connection it should be noted that in the preferred embodiment the slots 80 are of uniform widths to provide a linear relationship between the position of the thimble member 70 and the cross sectional areas of the slots 80 positioned below the sleeve 54. In other words, it is preferred that the relationship between the position of the thimble member 70 and the degree of opening of the orifices 80 be linear.

As previously indicated, the rod 72 extends from the thimble member 70 upwardly through the tubular rod guide 22. The diameter of the rod 72 is of a size to provide a sliding fit of the rod in the guide 22 with a minimum of leakage of fluid from the chamber 46 upwardly around the rod 72. Although the rod 72 and guide 22 provide only a metal-to-metal seal against the escape of fluid from the chamber 46, the guide 22 may be of any desired length which will provide an effective seal, without providing an appreciable amount of friction against lengthwise movement of the rod 72.

The lower end 82 of the rod 72 extends through the open end 74 of the thimble 70 and into a tubular boss 84 formed on the upper face of the closed end 76 of the thimble. The boss 84 is formed concentrically with respect to the thimble 70 and is provided with an inwardly extending circumferential flange 86 at the upper end thereof of a size to fit loosely around the lower end portion 82 of the rod 72. Also, a stop flange 88 is secured on the lower end of the rod 72 below the flange 86 to contact the flange 86 and limit the upward movement of the rod 72 with respect to the thimble member. The loose connection of the rod 72 to the thimble member 70 is provided to minimize the necessity of precisely aligning the inner diameter of the sleeve 54 with the inner diameter of the rod guide 22, such that the piston assembly 68 will not be placed in a bind during movement thereof in the chamber 46. It will be noted, however, that fluid inside of the thimble member 70 has communication between the lower end portion 82 of the rod 72 and the flange 86 into the boss 84 to react in an upward direction on the lower end of the rod 72 and constantly retain the stop flange 88 in contact with the flange 86. Thus, the rod 72 will follow the movements of the thimble member 70.

A threaded aperture 90 is formed through the central portion of the closed end 76 of the thimble member 70 in communication with the boss 84, such that the rod 72 may be moved lengthwise through the lower end 76 of the thimble member during repair and re-assembly of the device. The aperture 90 is normally closed by a suitable plug 92 to prevent passage of fluid directly through the lower end 76 of the thimble member and provide the lower end 76 of the thimble member with a downwardly facing area equal to the cross sectional area of the thimble member.

In analyzing the effective pressure areas of the piston assembly 68 and the response of the piston assembly to fluid flowing from the inlet 34 to the outlet 40, it will be observed that the piston assembly 68 is urged in a direction toward the outlet 40 by a force equal to the pressure of fluid in the reduced diameter portion 56 of the chamber 46 times the cross sectional area of the thimble member 70 (minus the cross sectional area of the rod 72), plus the cross sectional area of the rod 72 times atmospheric pressure. Simultaneously, the piston assembly 68 is urged upwardly toward the inlet 34 by a force equal to the pressure of fluid in the lower, larger end of the chamber 46 times the cross sectional area of the thimble member 70. Therefore, the function of the piston assembly 68 is controlled by the following relationship:

$$(B-A)P_1 = BP_2 = \text{a constant}$$

Wherein, $B$ = the cross sectional area of the thimble member 70,
$A$ = the cross sectional area of the rod 72,
$P_1$ = the pressure of the fluid in the reduced diameter portion 56 of the chamber 46 (which may be considered the pressure of the fluid in the flow line portion 36), and
$P_2$ = the pressure of the fluid in the lower end of the chamber 46 (which may be considered to be equal to the pressure of the fluid in the flow line portion 42 downstream of the device 10).

In view of the foregoing, it will be apparent that the pressure drop of fluid flowing through the orifices 80 ($P_1-P_2$) is determined by the difference in cross sectional areas of the thimble member 70 and the rod 72. For example, the pressure of power oil being directed to a subsurface hydraulic pump may be 2,000 pounds per square inch. For such a pressure level, I have found that the cross sectional area of the rod 72 may be equal to only 1% of the cross sectional area of the thimble member 70 to provide a highly efficient flow responsive device. With this relationship of areas, the pressure drop of the fluid flowing through the orifices 80 will be equal to 1% of the pressure of the fluid in the conduit portion 36 ($P_1$) which, in a typical subsurface pump installation, will be equal to 20 pounds per square inch. Such a pressure drop provides no observable effect on the efficiency of operation of a subsurface hydraulic pump. It will be apparent to those skilled in the art, however, that the difference in the cross sectional areas of the rod 72 and the thimble member 70 will also control the amount of force with which the piston assembly 68 is moved upon a variation in the rate of flow of fluid through the device. Therefore, this area relationship may be designed as desired to provide the necessary amount of force on the piston assembly for operating a suitable registering mechanism 94 in accordance with the pressure of the fluid being measured.

The registering mechanism 94 may comprise any suitable indicating or recording mechanism, such as a scribe 96 carried by the rod 72 in a position to provide a curve 98 on a drum-mounted chart 100. In this illustration, the chart 100 is mounted on a suitable drum 102 being driven from a suitable power source (not shown) connected to the shaft 104 of the drum. It will be apparent that when the drum 102 is rotated at a constant speed, the scribe 96 will provide a graph 98 indicative of the variations in the rate of flow of the fluid through the device 10. It will also be apparent to those skilled in the art that the chart 100 may be calibrated in any desired fashion to provide the desired units of measure.

As the rate of fluid flow through the device 10 increases, the thimble member 70 moves toward the outlet 40 to progressively open the orifices 80 and accommodate the increased flow of fluid. Circumferentially spaced lugs 105 on the closed end 76 of the thimble member 70 prevent closing off of the outlet 40 at maximum fluid flow. Upon a decrease in the rate of flow through the device 10, the movement of the thimble member 70 is in a reverse direction, since the effective pressure areas of the piston assembly 68 are such as to constantly maintain a uniform pressure drop through the orifices 80. It should also be noted that since the velocity of fluid through an orifice is directly related only to the square root of the pressure of the fluid being measured times .01, normal variations in the pressure of the fluid in the conduit portion 36 provide no appreciable effect on the rate of flow measurement being made by the piston assembly 68. For example, the change in velocity of a fluid flowing through an orifice when the pressure of the fluid varies from 2,000 to 2,050 pounds per square inch is approximately 1.242 percent increase, considering a perfect orifice and non-critical flow. It will therefore be apparent that the rate of flow measurement will not be affected by normal fluctuations in the pressure of the fluid being measured. It should also be noted that the device 10 may be utilized to measure the rate of flow of a fluid having substantially any pressure. Furthermore, when the rate of flow of fluid through the device 10 is equal to zero, the thimble member 70 will be moved upwardly into the sleeve 54 until the orifices 80 are completely closed, to provide such a zero reading on the chart 100, regardless of the position in which the device 10 is being used.

From the foregoing it will be apparent that the present invention will materially facilitate the analysis of any fluid-operated equipment by providing precise measurements of the variations in the rate of flow of fluid to or from such equipment. The present variable orifice type flow responsive device relies upon only a differential of the pressure of the fluid being measured for operation thereof (as contrasted with the use of weights or counterweights) and the device will give an accurate and substantially instantaneous measure of variations in the rate of flow regardless of the direction in which the device is extended during operation. It will also be apparent that the differential area relationship of the variable orifice member may be controlled as desired to provide the necessary force for operating substantially any type of registering apparatus. Finally, it will be apparent that the present flow responsive device is simple in construction, may be economically manufactured and will have a long service life.

Changes may be made in the combination or arrangement of parts or elements as heretofore set forth in the specification and shown in the drawings, it being understood that changes may be made in the precise embodiment disclosed without departing from the spirit and scope of the invention as defined in the following claims.

I claim:

1. A flow responsive device for interposition in a fluid flow line, comprising a hollow housing through which fluid is directed in one direction, said housing having a variable inner diameter, differential area piston means reciprocally disposed in said housing with the larger end thereof facing in the direction of fluid flow and the smaller end thereof protruding through one end of the housing in communication with atmospheric pressure, means forming a linearly variable orifice in said piston means extending in a direction to progressively open upon movement of said piston means in the direction of fluid flow, and means for registering movements of said piston means to indicate variations in the rate of said fluid flow.

2. A flow responsive device for interposition in a fluid flow line, comprising a hollow housing forming an elongated chamber, said housing having an inlet communicating with one end of the chamber and an outlet communicating with the opposite end of the chamber for directing fluid flowing through the flow line to flow through the chamber, said chamber having a reduced diameter portion adjacent said inlet and an enlarged diameter portion adjacent said outlet, a hollow thimble member slidingly fitting in the reduced diameter portion of the chamber for movement partially in and out of the enlarged diameter portion of the chamber, the end of said thimble closest to said outlet being closed and the opposite end thereof being open, at least one slot in the thimble extending from adjacent the closed end thereof toward the open end thereof forming a linearly variable orifice for passage of said fluid therethrough into the larger diameter portion of the chamber, a rod secured to the thimble and slidingly extending through a mating bore in the end of the housing associated with said inlet for movement with the thimble upon variations in flow through said orifice, and means for registering the lengthwise movements of said rod.

3. A device as defined in claim 2 characterized further to include a sleeve secured in said chamber to form the reduced diameter portion of said chamber and slidingly receive said thimble.

4. A flow responsive device for interposition in a fluid flow line, comprising a hollow housing forming an elongated chamber, said housing having an inlet communicating with one end of the chamber and an outlet communicating with the opposite end of the chamber for directing fluid flowing through the flow line to flow through the chamber, said chamber having a reduced diameter portion adjacent said inlet and an enlarged diameter portion adjacent said outlet, a hollow thimble member slidingly fitting in the reduced diameter portion of the chamber for movement partially in and out of the enlarged diameter portion of the chamber, the end of said thimble closest to said outlet being closed and the opposite end thereof being open, at least one slot in the thimble extending from adjacent the closed end thereof toward the open end thereof forming a linearly variable orifice for passage of said fluid therethrough into the larger diameter portion of the chamber, a rod secured to the thimble and slidingly extending through a mating bore in the end of the housing associated with said inlet for movement with the thimble upon variations in the flow through said orifice, means for registering the lengthwise movements of said rod, the closed end of said thimble having a hollow boss on the central portion thereof extending toward the open end of the thimble, one end of said rod being extended into said boss, cooperating stops on said rod end and said boss limiting the movement of said rod away from the closed end of the thimble, the closed end of the thimble having an aperture in the central portion thereof in alignment with said boss for replacement of said rod therethrough, and a plug removably secured in said aperture.

5. A flow responsive device for interposition in a fluid flow line, comprising a hollow housing forming an elongated chamber, said housing having an inlet communicating with one end of the chamber and an outlet communicating with the opposite end of the chamber for directing fluid flowing through the flow line to flow through the chamber, said chamber having a reduced diameter portion adjacent said inlet and an enlarged diameter portion adjacent said outlet, a hollow thimble member slidingly fitting in the reduced diameter portion of the chamber for movement partially in and out of the enlarged diameter portion of the chamber, the end of said thimble closest to said outlet being closed and the opposite end thereof being open, at least one slot in the thimble extending from adjacent the closed end thereof toward the open end thereof forming a linearly variable orifice for passage of said fluid therethrough into the larger diameter portion of the chamber, a rod secured to the thimble and slidingly extending through a mating bore in the end of the housing associated with said inlet for movement with the thimble upon variations in flow through said orifice, means for registering the lengthwise movements of said rod, said outlet being concentric with the respective end of said chamber and having a diameter substantially less than said chamber, and a plurality of circumferentially spaced lugs on the closed end of the thimble positioned to contact the respective end of the chamber when said orifices are opened to the maximum extent and provide passageways for said fluid into said outlet.

References Cited in the file of this patent
UNITED STATES PATENTS 808,562    Millon _____ Dec. 26, 1905

FOREIGN PATENTS 5,804    Germany _____ June 26, 1879

UNITED STATES PATENT OFFICE
CERTIFICATE OF CORRECTION

Patent No. 3,112,646                 December 3, 1963

Charles L. English

It is hereby certified that error appears in the above numbered patent requiring correction and that the said Letters Patent should read as corrected below.

Column 2, line 1, before "force" insert -- variations in the rate of fluid flow. Furthermore, the --.

Signed and sealed this 28th day of April 1964.

(SEAL)
Attest:

ERNEST W. SWIDER

Attesting Officer

EDWARD J. BRENNER

Commissioner of Patents